UNITED STATES PATENT OFFICE.

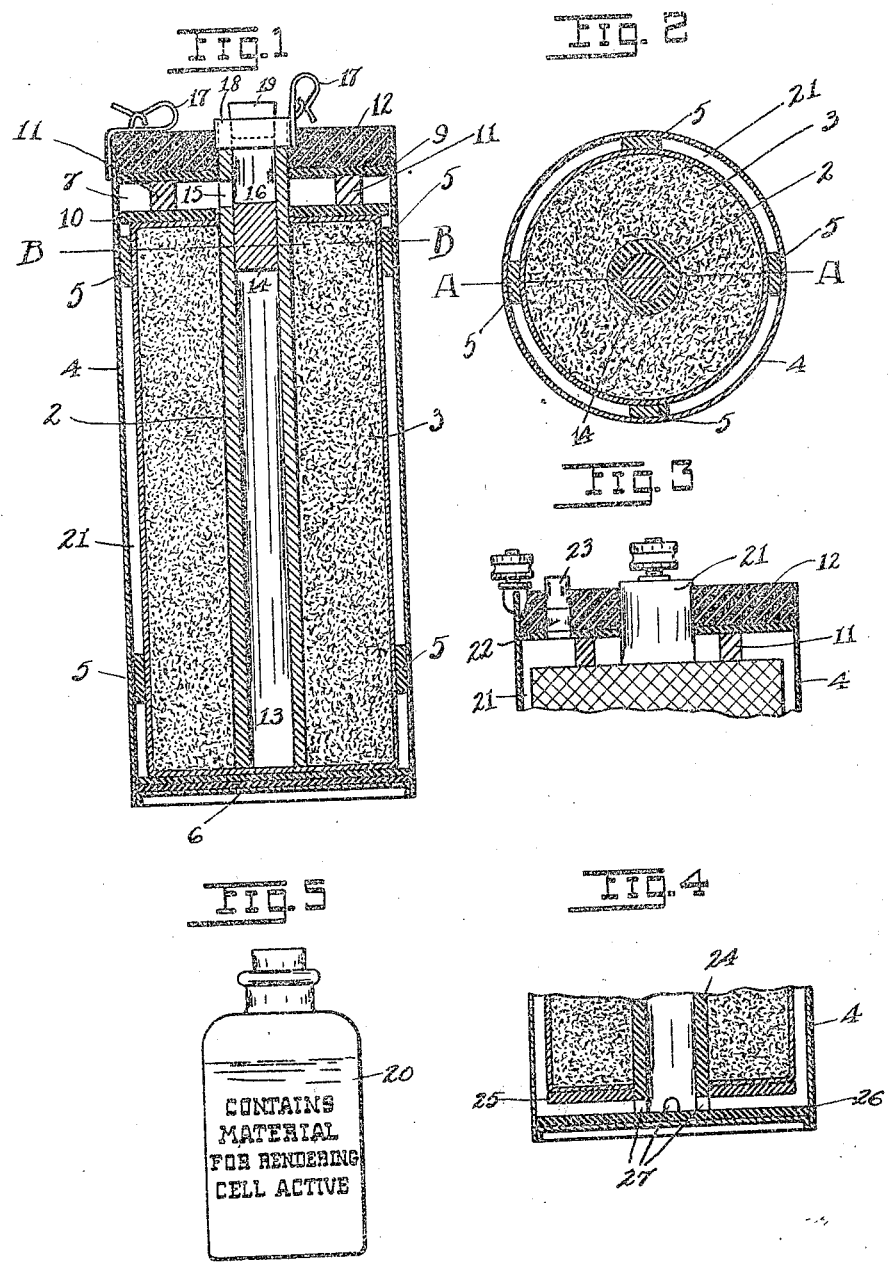

HARRY F. FRENCH AND RAYMOND C. BENNER, OF FREMONT, OHIO, ASSIGNORS, BY MESNE ASSIGNMENTS, TO NATIONAL CARBON COMPANY, INC., A CORPORATION OF NEW YORK.

ELECTRIC BATTERY.

1,390,524.

Specification of Letters Patent. Patented Sept. 13, 1921.

Application filed January 27, 1917. Serial No. 144,830.

*To all whom it may concern:*

Be it known that we, HARRY F. FRENCH and RAYMOND C. BENNER, citizens of the United States, and residents, respectively, of Fremont in the county of Cuyahoga and State of Ohio, and Fremont, in the county of Cuyahoga and State of Ohio, have invented a certain new and useful Improvement in Electric Batteries, of which the following is a full, clear, and exact description.

This invention relates to dry cells and aims to prevent electrochemical action therein prior to the time the cells are put into use.

It is old to make up dry cells with no electrolyte in the mix, the user adding the electrolyte when the cell is to be made active. It is also old to incorporate dry electrolyte salts in the mix or in a chamber in the cell, with the idea that the user will add water to dissolve these and thereby put the cell into action.

If a cell mix is compacted in a substantially dry condition and the electrolyte solution is afterward added to the cell, it requires a long time for the liquid to penetrate the compacted mix. A dry mix also loosens up on being soaked with solution. Therefore the prior types of cells, such as referred to above, have not given the best results, due on the one hand to the length of time required for the cell to be made fully active, and on the other to the high resistance of the cell, resulting from the loosening of the mix. In such prior types of cells it requires an hour or more for the cells to absorb the required amount of liquid. Even then the maximum short circuit current of the cells rarely exceeds 18 amperes, whereas the amperage of a normal cell should be from 25 to 32 amperes.

Our invention aims to overcome these disadvantages.

Referring to the drawings:

Figure 1 is a vertical section of a dry cell taken on the line A—A of Fig. 2.

Fig. 2 is a horizontal section of the cell taken on the line B—B of Fig. 1.

Fig. 3 is a partial section of a modification.

Fig. 4 is a further modification.

Fig. 5 is the container of paste material for rendering the cell active.

Referring to the drawings, the mix 3 which may consist of the usual ingredients, such as manganese peroxid and powdered carbon or graphite, is thoroughly moistened before it is compacted with the required amount of electrolyte solution, in exactly the same way as if the cell were of the ordinary type. The percentage of electrolyte in the mix may of course vary depending upon the purpose of the cell, the idea being to properly balance the moisture in the paste with that already in the mix, so that there will be minimum absorption of additional moisture by the mix when the user adds the paste to the cell.

The cartridge is spaced from the zinc can 4 by a plurality of attached strips of insulating material 5, such as waterproofed pulpboard for example, so that the cartridge does not come in contact with the zinc, it being spaced from the can at the bottom by one or more cardboard disks 6 which are also waterproofed, for example by soaking in a molten mixture consisting of equal parts of paraffin wax and rosin. A channel or space 7 is provided at the top of the cell with two waterproofed cardboard or pulpboard disks 9 and 10 spaced apart with two or more wooden strips or blocks 11, the cell being closed at the top by the usual pitch or wax seal 12.

While it is not necessary, so far as the invention is concerned, it is preferable from a manufacturing standpoint to pierce the entire carbon 2 with a hole 13 and then close it below the plane of chamber 7 by means of a cork or other stopper 14. One or more holes 15 furnish communication between the upper cavity 16 of the carbon and the chamber 7.

Any type of binding post or terminal is permissible, but by way of example we have shown clips 17 soldered to the zinc and to a metal band or ring 18 which is forced upon or otherwise secured to the carbon 2. After the cavity 16 in the carbon is closed by a cork or stopper 19 and the usual jacket (not shown) is supplied, the cell is ready to be shipped or stored.

With each of the cells placed on the market, will be furnished a bottle or other receptacle 20 containing the requisite amount of flour or other vegetable paste for filling the space 21 between the cartridge and the zinc, whenever the cell is to be made active. This paste can be made up in any desired proportions and may contain other material than flour and water. We have found that a successful paste consists of 24 per cent. flour, 75 per cent. water and 1 per cent. mercuric chlorid, but these amounts are given merely by way of example.

The cell, as previously described, can be stored indefinitely without the zinc being acted on by the electrolyte or any electrochemical action taking place in the cell. Consequently it will remain on "shelf" indefinitely without deterioration. All that is necessary to make the cell immediately active is to pour the flour paste from bottle 20 into the hole 16 of carbon 2 after removing stopper 19. The paste flows immediately through chamber 7 into the space 21 and no time is required for the solution to soak into the cartridge 3 because such cartridge already contains the desired amount of electrolyte. Cells when made in this way reach their full activity within a very short time after adding the flour paste, and since the electrolyte mix is not permeated to any great extent by the solution after it is once compacted, the resistance of the cell is normal, enabling it to give the normal short circuit current which is indicative of its capacity for standing rigorous service.

After the the paste has been added to the cell the stopper 19 will be replaced to prevent undue evaporation.

One decided objection to prior cells of this type is the length of time required for the water solution to dissolve the electrolyte salts or for the added electrolyte to penetrate the mix. With such cells it is necessary for the user to add as much electrolyte as the cell will take and then wait until this soaks in before any more can be added. It therefore requires considerable time for the user to add the electrolyte or water to the cell, which is a considerable disadvantage. In the improved cell all the flour paste can be poured immediately into the cell as it will flow readily into the proper space of the cell.

The material in bottle 20 may consist of dry powdered ingredients to which the customer will add water while stirring thoroughly, to produce the paste before pouring the contents into the cell. One advantage of this is the elimination of all danger of freezing while in storage. This also may be accomplished by adding to the ready mixed paste certain ingredients which will lower the freezing point and remain neutral in the cell or even beneficially enter into the electrochemical action. As an example of such, we may mention calcium chlorid.

There are various ways of incorporating the improvement in a cell, and while space will not permit of illustrating all of them in this application, we have shown in Fig. 3 a modification in which a solid carbon 21' is used, the paste being added through a hole 22 in the seal which may be closed by stopper 23.

In Fig. 4 another modification is illustrated. In this figure a hollow carbon 24 permits the flour paste to reach the space 21 by flowing to the bottom of the cell and out between two spaced cardboard disks 25 and 26, holes 27 being provided at the base of the carbon for this purpose.

Having described our invention, what we claim is:

1. An electric cell of the reserve type comprising; a closure for the cell having an opening therein; a positive electrode, a negative cartridge assembled in spaced relationship from the positive electrode; paste material normally out of contact with the electrode and cartridge, adapted to be introduced in the space between the cartridge and electrode through said opening, said space being connected with the opening in the closure whereby the paste may be introduced to render the cell active.

2. An electric cell of the reserve type; comprising a closure for the cell having an opening therein; a positive electrode and negative cartridge assembled in spaced relationship, said cartridge containing substantially the desired amount of electrolyte solution; paste material normally out of contact with the electrode and cartridge, adapted to be introduced in the space between the cartridge and positive electrode through said opening, said space being connected with the opening in the closure whereby the paste may be introduced to render the cell active.

3. An electric cell of the reserve type; comprising a positive electrode, a negative cartridge spaced from the positive electrode; a closure at one end of the cell, said cell having means whereby paste may be introduced into the space between the positive electrode and cartridge to render the cell active.

4. An electric cell consisting of a positive electrode, a negative cartridge containing substantially the desired amount of electrolyte solution and spaced from the positive electrode, and a seal at the top of the cell, said cell having means whereby paste may be introduced into said space to make the cell active.

5. An electric cell of the reserve type comprising; a positive electrode; a negative cartridge containing substantially the desired amount of electrolyte solution, said cartridge and positive electrode being assembled in spaced relationship; a closure in the upper end of the cell said closure having an opening connected with the space between the positive electrode and cartridge whereby paste may be introduced into the space to render the cell active.

6. An electric cell of the reserve type comprising a zinc can, a carbon electrode having a channel therein; a compacted mix around said carbon electrode and spaced from the zinc can; a closure at the upper end of the cell and a chamber beneath the closure connected with said channel and space intermediate to the mix and can whereby paste material may be added to the cell to render it active.

7. An electric cell consisting of a zinc can, a carbon electrode having a channel therein, a compacted mix around said carbon electrode containing substantially the desired amount of electrolyte solution, means for spacing said can from said mix, a seal at the top of the cell and a chamber beneath the seal communicating with said channel and said space whereby paste solution can be added to make the cell active.

8. An electric battery consisting of a zinc can, a carbon electrode having a channel in the upper end thereof, a cartridge consisting of a mix compacted around said carbon electrode containing substantially the desired amount of electrolyte solution, said cartridge being spaced from the can, a seal at the top of the can, and means for connecting the channel with the space between the can and cartridge.

9. An electric battery of the reserve type comprising; a zinc can; a carbon electrode having a channel in the upper end thereof; a cartridge consisting of a mix compacted around the carbon electrode said cartridge being spaced from the can; a closure at the upper end of the can; means for connecting the channel in the carbon electrode with the space intermediate to the can and cartridge and means for closing the channel in the upper end of the carbon electrode.

10. Method of manufacturing a reserve cell and rendering it active, which consists in assembling the anode and cathode with a space intermediate thereto in a closed container having an opening connected with said space, and introducing paste into said space through the opening to render the cell active.

11. The method of manufacturing a reserve cell and rendering it active, which consists in inserting a cathode in an anode container, spacing the anode from the cathode, closing the container and introducing paste into the space between the anode and cathode from the exterior through an opening connected with said space.

12. Method of manufacturing a reserve cell rendering it active, which consists in inserting a cathode in an anode container, spacing the anode from the cathode, applying a closure to the container having an opening therein, and introducing paste into the space between the anode and cathode through the opening in the closure.

In testimony whereof, we hereunto affix our signatures.

HARRY F. FRENCH.
RAYMOND C. BENNER.